(12) United States Patent
Liu

(10) Patent No.: US 10,057,087 B2
(45) Date of Patent: Aug. 21, 2018

(54) CHANNEL ESTIMATION METHOD, COMMUNICATIONS NODE, AND COMMUNICATIONS SYSTEM

(71) Applicant: HUAWEI TECHNOLOGIES CO., LTD., Shenzhen, Guangdong (CN)

(72) Inventor: Sheng Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/448,915

(22) Filed: Mar. 3, 2017

(65) Prior Publication Data
US 2017/0180158 A1    Jun. 22, 2017

Related U.S. Application Data

(63) Continuation of application No. PCT/CN2014/087807, filed on Sep. 29, 2014.

(51) Int. Cl.
*H04B 7/02* (2018.01)
*H04L 25/02* (2006.01)
*H04L 27/26* (2006.01)

(52) U.S. Cl.
CPC ...... *H04L 25/0228* (2013.01); *H04L 27/2613* (2013.01)

(58) Field of Classification Search
CPC ................................................ H04L 25/0228
USPC ....................................................... 375/267
See application file for complete search history.

(56) References Cited

U.S. PATENT DOCUMENTS

| 8,437,440 B1 * | 5/2013 | Zhang ............. H04L 1/0625 375/366 |
| 8,644,430 B1 | 2/2014 | Perahia et al. |
| 2005/0035885 A1 * | 2/2005 | Hosur ............... H04B 7/04 341/50 |
| 2007/0097946 A1 | 5/2007 | Mujtaba |
| 2009/0003467 A1 * | 1/2009 | Chen ............... H04L 27/2626 375/260 |

(Continued)

FOREIGN PATENT DOCUMENTS

| CN | 102668405 A | 9/2012 |
| JP | 2007529143 A | 10/2007 |

(Continued)

*Primary Examiner* — Lihong Yu
(74) *Attorney, Agent, or Firm* — Leydig, Voit & Mayer, Ltd.

(57) ABSTRACT

Embodiments of the present invention provide a channel estimation method, a communications node, and a communications system. The method includes: obtaining a preamble in a signal packet sent by a first communications node, where the preamble includes at least a first field and a second field, a subcarrier of an orthogonal frequency division multiplexing OFDM symbol of the first field is used to carry a first reference signal, the first reference signal is a predetermined signal that is known to both a second communications node and the first communications node, a subcarrier of an OFDM symbol of the second field is used to carry useful information, and the useful information is physical layer control information and/or data; and obtaining, by using the first field and the second field, a first channel estimate, of each spatial flow, on all subcarriers of a multiple-input multiple-output transmission frequency band.

14 Claims, 12 Drawing Sheets

(56) References Cited

U.S. PATENT DOCUMENTS

| | | |
|---|---|---|
| 2009/0034644 A1 | 2/2009 | Sandhu |
| 2012/0051476 A1* | 3/2012 | Shi .................. H04L 25/0204 |
| | | 375/359 |
| 2013/0259017 A1 | 10/2013 | Zhang et al. |
| 2014/0211775 A1 | 7/2014 | Sampath et al. |
| 2014/0241458 A1 | 8/2014 | Zhang et al. |
| 2017/0141888 A1 | 5/2017 | Liu et al. |

FOREIGN PATENT DOCUMENTS

| | | |
|---|---|---|
| WO | 2005/006701 A1 | 1/2005 |
| WO | 2005006699 A1 | 1/2005 |
| WO | 2009/035246 A2 | 3/2009 |

* cited by examiner

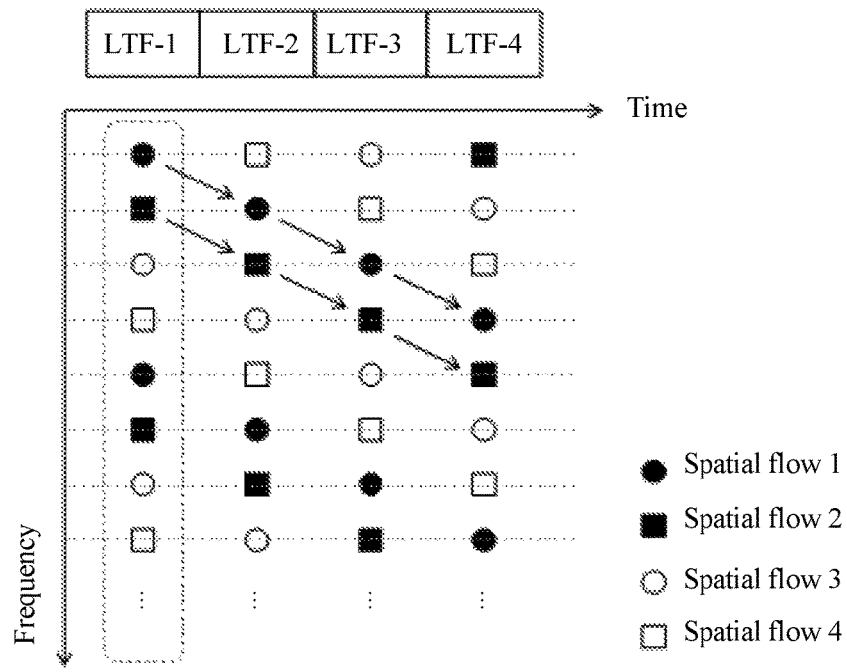

Obtain a preamble in a signal packet sent by a first communications node, where the preamble includes at least a first field and a second field, a subcarrier of an orthogonal frequency division multiplexing symbol of the first field is used to carry a first reference signal, the first reference signal is a determined signal that is known to both a second communications node and the first communications node, a subcarrier of an orthogonal frequency division multiplexing symbol of the second field is used to carry useful information, and the useful information is physical layer control information and/or data

202

Obtain, by using the first field and the second field in the preamble, a first channel estimate, of each spatial flow, on all subcarriers on a multiple-input multiple-output transmission frequency band

FIG. 2

CHANNEL ESTIMATION METHOD, COMMUNICATIONS NODE, AND COMMUNICATIONS SYSTEM

CROSS-REFERENCE TO RELATED APPLICATIONS

This application is a continuation of International Application No. PCT/CN2014/087807, filed on Sep. 29, 2014, the disclosure of which is hereby incorporated by reference in its entirety.

TECHNICAL FIELD

Embodiments of the present invention relate to wireless communications technologies, and in particular, to a channel estimation method, a communications node, and a communications system.

BACKGROUND

Wireless local access network (WLAN) standards based on an orthogonal frequency division multiplexing technology (OFDM) include gradually evolved releases such as 802.11a, 802.11n, and 802.11ac. 802.11n and 802.11ac already support single user multiple-input multiple-output (SU-MIMO), and 802.11ac further supports downlink multi-user multiple-input multiple-output (MU-MIMO). Currently, the IEEE 802.11 standard organization has started standardization work of a new generation WLAN standard 802.11ax, which is referred to as a high efficiency WLAN (HEW for short). Orthogonal frequency division multiple access (OFDMA) and uplink MU-MIMO are two key technologies in 802.11ax. In SU-MIMO and MU-MIMO, multiple spatial flows are transmitted in parallel by means of MIMO; before performing receiving processing, such as demodulation, on all spatial flows, a receive end first needs to obtain a MIMO channel estimate. For example, in uplink MU-MIMO, to demodulate signals from different stations (Station, STA for short), an access point (AP) may obtain, by using high efficiency (HE) long training fields (LTF) (HE-LTF for short) in preambles of uplink packets sent by all STAs, a channel estimate of uplink MU-MIMO.

FIG. 1 is a schematic diagram of an existing HE-LTF solution. In the existing solution, an HE-LTF includes N OFDM symbols, where N is a quantity of spatial flows (when a quantity of actual spatial flows is an odd number greater than 1, N is the quantity of the actual spatial flows plus 1; when a quantity of actual spatial flows is 1, N=1). Each row in FIG. 1 represents a subcarrier and each column represents an OFDM symbol. Each icon (e.g., ●, □, ○ and ■) represents a different reference signal (RS) pattern. For example, in the first row (i.e., first subcarrier), the first OFDM symbol carries RS pattern ●, the second OFDM symbol carries RS pattern □, the third OFDM symbol carries RS pattern ○, and the forth OFDM symbol carries the RS pattern ■. For the same subcarrier, the OFDM symbols are divided into groups each of which includes four OFDM symbols in this example. In each group, the first OFDM symbol always carries RS pattern ●, the second OFDM symbol always carries RS pattern □, the third OFDM symbol always carries RS pattern ○ and the forth OFDM symbol always carries RS pattern ■—.

Available subcarriers of each OFDM symbol carry reference signals, and sequentially in time correspond to different spatial flows by means of subcarrier interleaving. An available subcarrier is a subcarrier except if the subcarrier is a zero-frequency subcarrier or a protection subcarrier that is used to suppress adjacent channel leakage of an MIMO transmission frequency band. Specifically, a quantity of subcarriers corresponding to each spatial flow in an OFDM symbol is M/N, where M is a quantity of available subcarriers. All the spatial flows sequentially correspond to different subcarriers in each OFDM symbol, and subcarriers that are corresponding to a corresponding spatial flow and that are in every two OFDM symbols are staggered by a location of one subcarrier. Therefore, within a range of N OFDM symbols, subcarriers corresponding to each spatial flow are distributed to locations of all available subcarriers, and the subcarriers corresponding to all spatial flows are mutually orthogonal. In this way, a channel estimate, of a corresponding spatial flow, on each available subcarrier is obtained by using reference signals carried by subcarriers corresponding to each spatial flow in the HE-LTF.

For example, and with reference to spatial flow 1 in FIG. 1, the first OFDM symbol (LTF-1), RS pattern ● which corresponds to spatial flow 1 occupies $1^{st}$, $5^{th}$, $9^{th}$ ... subcarriers. In the second OFDM symbol (LTF-2), RS pattern ● which corresponds to spatial flow 1 occupies $2^{nd}$, $6^{th}$, $10^{th}$ ... subcarriers. Therefore, subcarriers which carries RS pattern ● in one OFDM symbol are different from those in other OFDM symbols. And in consecutive OFDM symbols, the sequential number of the subcarriers that carry RS pattern ● is added by one, for example, $1^{st}$, $5^{th}$, $9^{th}$ in former OFDM symbol and $2^{nd}$ ($1^{st}$+1), $6^{th}$ ($5^{th}$+1), $10^{th}$ ($9^{th}$+1) in letter OFDM symbol. When the OFDM symbols continuously goes on, the subcarrier that carries a given RS pattern will traverse from the $1^{st}$ subcarrier to the last subcarrier.

For ease of description, in the present invention, a distribution pattern of locations of subcarriers corresponding to all spatial flows in an $n^{th}$ OFDM symbol of the HE-LTF is defined as $\Psi(n)$. Locations of subcarriers corresponding to different spatial flows are distinguished by using different symbols, and a distribution pattern of locations of subcarriers corresponding to all spatial flows in a next OFDM symbol may be represented as $\Psi(n+1)$. "+1" indicates that locations of subcarriers corresponding to all spatial flows in the OFDM symbol are moved forward or backward by a location of one subcarrier. In this way, in the existing HE-LTF solution shown in FIG. 1, distribution patterns of locations of subcarriers corresponding to all spatial flows in N OFDM symbols are sequentially $\Psi(1)$, $\Psi(2)$, ..., $\Psi(N)$.

An existing WLAN system based on the OFDM technology uses an OFDM symbol whose length is 4 us. To support outdoor application and improve OFDMA performance, the 802.11ax standard supports the use of an OFDM symbol whose length is four times the length of an existing OFDM symbol or greater. When an OFDM symbol whose length is four times the length of an existing OFDM symbol is used, it indicates that a length of each OFDM symbol is 16 us. For example, for a typical WLAN packet whose length is 1-3 ms, when eight spatial flows are transmitted, a length of an HE-LTF is up to 128 us, an overhead is up to 4.3% to 12.8%, and consequently resource utilization is low.

SUMMARY

Embodiments of the present invention provide a channel estimation method, a communications node, and a communications system, which reduces a signaling overhead and improves resource utilization while ensuring performance of channel estimation.

A first aspect of the present invention provides a channel estimation method, where the method includes:

obtaining a preamble in a signal packet sent by a first communications node, where the preamble includes at least a first field and a second field, a subcarrier of an orthogonal frequency division multiplexing OFDM symbol of the first field is used to carry a first reference signal, the first reference signal is a predetermined signal that is known to both a second communications node and the first communications node, a subcarrier of an OFDM symbol of the second field is used to carry useful information, and the useful information is physical layer control information and/or data; and obtaining, by using the first field and the second field in the preamble, a first channel estimate, of each spatial flow, on all subcarriers of a multiple-input multiple-output MIMO transmission frequency band.

In a first possible implementation manner of the first aspect, all subcarriers in each OFDM symbol of the first field and the second field sequentially correspond to different spatial flows, and spatial flows corresponding to subcarriers of a same location in different OFDM symbols are different.

In a second possible implementation manner of the first aspect, all subcarriers in each OFDM symbol of the first field and the second field sequentially correspond to different spatial flow groups, spatial flow groups corresponding to subcarriers of a same location in different OFDM symbols are different, and the spatial flow group includes K spatial flows; in the first field, after undergoing orthogonal transform, the K spatial flows of each spatial flow group are sequentially transmitted by using subcarriers that are corresponding to the spatial flow group and that are of K OFDM symbols of the first field; and in the second field, after undergoing orthogonal transform, the K spatial flows of each spatial flow group are sequentially transmitted by using subcarriers that are corresponding to the spatial flow group and that are of K OFDM symbols of the second field.

In a third possible implementation manner of the first aspect, the subcarrier is a subcarrier except a zero-frequency subcarrier and a protection subcarrier that is used to suppress adjacent channel leakage of the MIMO transmission frequency band.

In a fourth possible implementation manner of the first aspect, the obtaining, by using the first field and the second field in the preamble, a first channel estimate, of each spatial flow, on all subcarriers of a multiple-input multiple-output MIMO transmission frequency band includes:

obtaining, by using the first reference signal carried by the first field, a channel estimate, of each spatial flow, on a corresponding subcarrier in the first field;

obtaining, by means of interpolation, a second channel estimate, of each spatial flow, on all subcarriers of the MIMO transmission frequency band;

demodulating and decoding, by using the second channel estimate, the second field to obtain the useful information carried by the second field;

re-encoding and re-modulating, by using a modulation and coding scheme that is the same as that used in the demodulation and decoding operations, the useful information carried by the second field, to generate a second reference signal corresponding to each subcarrier of each OFDM symbol of the second field;

obtaining, by using the second reference signal corresponding to each subcarrier of each OFDM symbol of the second field, a channel estimate, of each spatial flow, on a corresponding subcarrier in the second field; and obtaining, by combining channel estimates, of each spatial flow, on corresponding subcarriers in the first field and the second field, the first channel estimate, of each spatial flow, on all subcarriers of the MIMO transmission frequency band.

According to a second aspect, the embodiments of the present invention provide a channel estimation method, where the method includes:

determining a preamble in a signal packet, where the preamble includes at least a first field and a second field, a subcarrier of an orthogonal frequency division multiplexing OFDM symbol of the first field is used to carry a first reference signal, the first reference signal is a predetermined signal that is known to both a first communications node and a second communications node, a subcarrier of an OFDM symbol of the second field is used to carry useful information, and the useful information is physical layer control information and/or data; and sending the signal packet that includes the preamble to the second communications node.

In a first possible implementation manner of the second aspect, wherein all subcarriers in each OFDM symbol of the first field and the second field sequentially correspond to different spatial flows, and spatial flows corresponding to subcarriers of a same location in different OFDM symbols are different.

In a second possible implementation manner of the second aspect, wherein all subcarriers in each OFDM symbol of the first field and the second field sequentially correspond to different spatial flow groups, spatial flow groups corresponding to subcarriers of a same location in different OFDM symbols are different, and the spatial flow group comprises K spatial flows; in the first field, after undergoing orthogonal transform, the K spatial flows of each spatial flow group are sequentially transmitted by using subcarriers that are corresponding to the spatial flow group and that are of K OFDM symbols of the first field; and in the second field, after undergoing orthogonal transform, the K spatial flows of each spatial flow group are sequentially transmitted by using subcarriers that are corresponding to the spatial flow group and that are of K OFDM symbols of the second field.

According to a third aspect, the embodiments of the present invention provide a second communications node, where the second communications node includes:

an obtaining module, configured to obtain a preamble in a signal packet sent by a first communications node, where the preamble includes at least a first field and a second field, a subcarrier of an orthogonal frequency division multiplexing OFDM symbol of the first field is used to carry a first reference signal, the first reference signal is a predetermined signal that is known to both the second communications node and the first communications node, a subcarrier of an OFDM symbol of the second field is used to carry useful information, and the useful information is physical layer control information and/or data; and a channel estimation module, configured to obtain, by using the first field and the second field in the preamble obtained by the obtaining module, a first channel estimate, of each spatial flow, on all subcarriers of a multiple-input multiple-output MIMO transmission frequency band.

In a first possible implementation manner of the third aspect, all subcarriers in each OFDM symbol of the first field and the second field sequentially correspond to different spatial flows, and spatial flows corresponding to subcarriers of a same location in different OFDM symbols are different.

In a second possible implementation manner of the third aspect, all subcarriers in each OFDM symbol of the first field and the second field sequentially correspond to different spatial flow groups, spatial flow groups corresponding to subcarriers of a same location in different OFDM symbols are different, and the spatial flow group includes K spatial flows; in the first field, after undergoing orthogonal transform, the K spatial flows of each spatial flow group are sequentially transmitted by using subcarriers that are corresponding to the spatial flow group and that are of K OFDM symbols of the first field; and in the second field, after undergoing orthogonal transform, the K spatial flows of each spatial flow group are sequentially transmitted by using subcarriers that are corresponding to the spatial flow group and that are of K OFDM symbols of the second field.

In a third possible implementation manner of the third aspect, the subcarrier is a subcarrier except a zero-frequency subcarrier and a protection subcarrier that is used to suppress adjacent channel leakage of the MIMO transmission frequency band.

In a fourth possible implementation manner of the third aspect, the channel estimation module is specifically configured to:

obtain, by using the first reference signal carried by the first field, a channel estimate, of each spatial flow, on a corresponding subcarrier in the first field;

obtain, by means of interpolation, a second channel estimate, of each spatial flow, on all subcarriers of the MIMO transmission frequency band;

demodulate and decode, by using the second channel estimate, the second field to obtain the useful information carried by the second field;

re-encode and re-modulate, by using a modulation and coding scheme that is the same as that used in the demodulation and decoding operations, the useful information carried by the second field, to generate a second reference signal corresponding to each subcarrier of each OFDM symbol of the second field;

obtain, by using the second reference signal corresponding to each subcarrier of each OFDM symbol of the second field, a channel estimate, of each spatial flow, on a corresponding subcarrier in the second field; and obtain, by combining channel estimates, of each spatial flow, on corresponding subcarriers in the first field and the second field, the first channel estimate, of each spatial flow, on all subcarriers of the MIMO transmission frequency band.

According to a fourth aspect, the embodiments of the present invention provide a first communications node, where the first communications node includes:

a determining module, configured to determine a preamble in a signal packet, where the preamble includes at least a first field and a second field, a subcarrier of an orthogonal frequency division multiplexing OFDM symbol of the first field is used to carry a first reference signal, the first reference signal is a predetermined signal that is known to both a second communications node and the first communications node, a subcarrier of an OFDM symbol of the second field is used to carry useful information, and the useful information is physical layer control information and/or data; and a sending module, configured to send the signal packet that includes the preamble to the second communications node.

In a first possible implementation manner of the fourth aspect, wherein all subcarriers in each OFDM symbol of the first field and the second field sequentially correspond to different spatial flows, and spatial flows corresponding to subcarriers of a same location in different OFDM symbols are different.

In a second possible implementation manner of the fourth aspect, wherein all subcarriers in each OFDM symbol of the first field and the second field sequentially correspond to different spatial flow groups, spatial flow groups corresponding to subcarriers of a same location in different OFDM symbols are different, and the spatial flow group comprises K spatial flows; in the first field, after undergoing orthogonal transform, the K spatial flows of each spatial flow group are sequentially transmitted by using subcarriers that are corresponding to the spatial flow group and that are of K OFDM symbols of the first field; and in the second field, after undergoing orthogonal transform, the K spatial flows of each spatial flow group are sequentially transmitted by using subcarriers that are corresponding to the spatial flow group and that are of K OFDM symbols of the second field.

According to a fifth aspect, the embodiments of the present invention provide a second communications node, where the second communications node includes:

a transceiver, configured to obtain a preamble in a signal packet sent by a first communications node, where the preamble includes at least a first field and a second field, a subcarrier of an orthogonal frequency division multiplexing OFDM symbol of the first field is used to carry a first reference signal, the first reference signal is a predetermined signal that is known to both the second communications node and the first communications node, a subcarrier of an OFDM symbol of the second field is used to carry useful information, and the useful information is physical layer control information and/or data; and a processor, configured to obtain, by using the first field and the second field in the preamble obtained by the transceiver, a first channel estimate, of each spatial flow, on all subcarriers of a multiple-input multiple-output MIMO transmission frequency band.

In a first possible implementation manner of the fifth aspect, all subcarriers in each OFDM symbol of the first field and the second field sequentially correspond to different spatial flows, and spatial flows corresponding to subcarriers of a same location in different OFDM symbols are different.

In a second possible implementation manner of the fifth aspect, all subcarriers in each OFDM symbol of the first field and the second field sequentially correspond to different spatial flow groups, spatial flow groups corresponding to subcarriers of a same location in different OFDM symbols are different, and the spatial flow group includes K spatial flows; in the first field, after undergoing orthogonal transform, the K spatial flows of each spatial flow group are sequentially transmitted by using subcarriers that are corresponding to the spatial flow group and that are of K OFDM symbols of the first field; and in the second field, after undergoing orthogonal transform, the K spatial flows of each spatial flow group are sequentially transmitted by using subcarriers that are corresponding to the spatial flow group and that are of K OFDM symbols of the second field.

In a third possible implementation manner of the fifth aspect, the subcarrier is a subcarrier except a zero-frequency subcarrier and a protection subcarrier that is used to suppress adjacent channel leakage of the MIMO transmission frequency band.

In a fourth possible implementation manner of the fifth aspect, the processor is specifically configured to:

obtain, by using the first reference signal carried by the first field, a channel estimate, of each spatial flow, on a corresponding subcarrier in the first field;

obtain, by means of interpolation, a second channel estimate, of each spatial flow, on all subcarriers of the MIMO transmission frequency band;

demodulate and decode, by using the second channel estimate, the second field to obtain the useful information carried by the second field;

re-encode and re-modulate, by using a modulation and coding scheme that is the same as that used in the demodulation and decoding operations, the useful information carried by the second field, to generate a second reference signal corresponding to each subcarrier of each OFDM symbol of the second field;

obtain, by using the second reference signal corresponding to each subcarrier of each OFDM symbol of the second field, a channel estimate, of each spatial flow, on a corresponding subcarrier in the second field; and obtain, by combining channel estimates, of each spatial flow, on corresponding subcarriers in the first field and the second field, the first channel estimate, of each spatial flow, on all subcarriers of the MIMO transmission frequency band.

According to a sixth aspect, the embodiments of the present invention provide a first communications node, where the first communications node includes:

a processor, configured to determine a preamble in a signal packet, where the preamble includes at least a first field and a second field, a subcarrier of an orthogonal frequency division multiplexing OFDM symbol of the first field is used to carry a first reference signal, the first reference signal is a predetermined signal that is known to both a second communications node and the first communications node, a subcarrier of an OFDM symbol of the second field is used to carry useful information, and the useful information is physical layer control information and/or data; and a transmitter, configured to send the signal packet that includes the preamble to the second communications node.

In a first possible implementation manner of the sixth aspect, wherein all subcarriers in each OFDM symbol of the first field and the second field sequentially correspond to different spatial flows, and spatial flows corresponding to subcarriers of a same location in different OFDM symbols are different.

In a second possible implementation manner of the sixth aspect, wherein all subcarriers in each OFDM symbol of the first field and the second field sequentially correspond to different spatial flow groups, spatial flow groups corresponding to subcarriers of a same location in different OFDM symbols are different, and the spatial flow group comprises K spatial flows; in the first field, after undergoing orthogonal transform, the K spatial flows of each spatial flow group are sequentially transmitted by using subcarriers that are corresponding to the spatial flow group and that are of K OFDM symbols of the first field; and in the second field, after undergoing orthogonal transform, the K spatial flows of each spatial flow group are sequentially transmitted by using subcarriers that are corresponding to the spatial flow group and that are of K OFDM symbols of the second field.

According to a seventh aspect, the embodiments of the present invention provide a communications system, where the communications system includes:

any second communications node according to the third aspect, and the first communications node according to the fourth aspect.

According to the channel estimation method, the communications node, and the communications system provided in the embodiments of the present invention, an HE-LTF in a signal packet includes two parts. In a first part, a subcarrier of each OFDM symbol is used to carry a reference signal; in a second part, a subcarrier of each OFDM symbol is used to carry useful information instead of carrying a reference signal. Therefore, only a first field is actually used as an overhead for channel estimation. A quantity of OFDM symbols of the first field is less than a quantity of spatial flows. Therefore, compared with the prior art, technical solutions provided in the embodiments of the present invention greatly reduce a signaling overhead and improve resource utilization.

BRIEF DESCRIPTION OF DRAWINGS

FIG. 1 is a schematic diagram of an existing HE-LTF solution;

FIG. 2 is a flowchart of a channel estimation method according to an embodiment of the present invention;

DESCRIPTION OF EMBODIMENTS

Figure 3:
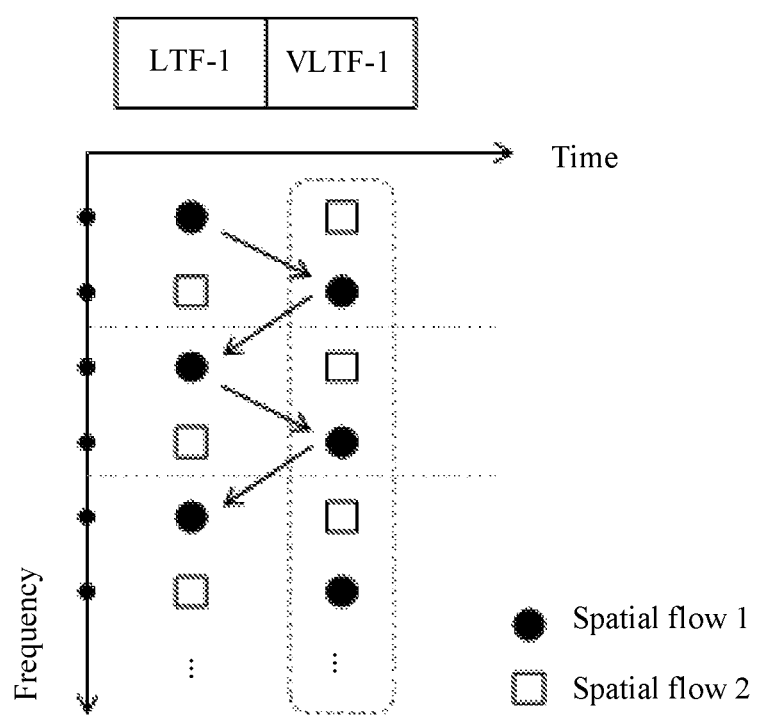
FIG. 3 is a distribution diagram of locations of subcarriers corresponding to all spatial flows (N=2) in a first field and a second field according to an embodiment of the present invention.

An 802.11ax signal packet includes two parts: a preamble and a data field. Preambles include a legacy preamble (Legacy Preamble) and a HEW preamble. The HEW preamble is a preamble specific to an 802.11ax packet, and includes at least parts such as a signaling field and a training field. The signaling field is used to transmit physical layer control information. The training field includes functions such as automatic gain control and providing a reference signal for channel estimation. An HE-LTF is a part of the training field.

In a channel estimation method provided in embodiments of the present invention, a preamble of a signal packet that is sent by a first communications node to a second communications node includes at least a first field and a second field. A quantity of OFDM symbols of the first field is less than a quantity of spatial flows, and a sum of OFDM symbols of the first field and the second field is not greater than the quantity of spatial flows. A subcarrier of each OFDM symbol of the first field carries a reference signal, the reference signal is a predetermined signal that is known to both the first communications node and the second communications node; typically, a symbol that is modulated by means of binary phase shift keying (BPSK), quadrature phase shift keying (QPSK), or the like may be used. For example, a transmitter transmits a "1+j" as a reference signal to a receiver and the receiver receives "0.8+0.7j". Since the receiver knows that what the transmitter transmits is "1+j", the receiver is able to estimates the channel by comparing "1+j" with "0.8+0.7j". A subcarrier of each OFDM symbol of the second field is used to transmit useful information instead of carrying a reference signal, and the useful information may be all or a part of physical layer control information and/or all or a part of data transmitted by using the signal packet.

In the channel estimation method provided in the embodiments of the present invention, the first field and the second field may be respectively understood as a first part and a second part of the HE-LTF field, so that in the present invention, in addition to a function of providing a reference signal for channel estimation, the HE-LTF field further has a function of transmitting all or a part of physical layer control information and/or all or a part of data. Alternatively, the first field may be understood as an HE-LTF field, and the second field may be understood as a part or all of the signaling field, and/or a part or all of the data field, so that in the present invention, in addition to a function of transmitting all or a part of physical layer control information and/or all or a part of data, the second field further has a function of providing a reference signal for channel estimation together with the first field.

Persons of ordinary skill in the art may understand that the foregoing two understanding manners are essentially the same, and either of the understanding manners does not affect implementation of technical solutions provided in the present invention.

FIG. 2 is a flowchart of a channel estimation method according to an embodiment of the present invention. As shown in FIG. 2, the channel estimation method provided in this embodiment of the present invention includes:

201. Obtain a preamble in a signal packet sent by a first communications node, where the preamble includes at least a first field and a second field, a subcarrier of each orthogonal frequency division multiplexing OFDM symbol of the first field is used to carry a first reference signal, the first reference signal is a predetermined signal that is known to both a second communications node and the first communications node, a subcarrier of each OFDM symbol of the second field is used to carry useful information, and the useful information is physical layer control information and/or data.

202. Obtain, by using the first field and the second field in the preamble, a first channel estimate, of each spatial flow, on all subcarriers of an MIMO transmission frequency band.

This embodiment of the present invention may be executed by a communications node in a wireless communications system, for example, a second communications node, and the second communications node communicates with a first communications node. Optionally, for example, the first communications node may be a STA, user equipment, or an access point; for example, the second communications node may be a STA, an access point, or user equipment.

It may be understood that the subcarrier described in this embodiment of the present invention refers to a subcarrier except a zero-frequency subcarrier and a protection subcarrier that is used to suppress adjacent channel leakage of the MIMO transmission frequency band.

A first communications node determines a preamble in a signal packet, and sends the signal packet that includes the preamble to a second communications node. The preamble includes at least a first field and a second field, a subcarrier of each orthogonal frequency division multiplexing OFDM symbol of the first field is used to carry a first reference signal, the first reference signal is a predetermined signal that is known to both the second communications node and the first communications node, and a subcarrier of each OFDM symbol of the second field is used to carry useful information. After obtaining the preamble in the signal packet sent by the first communications node, the second communications node obtains, by using the first field and the second field, a first channel estimate, of each spatial flow, on all subcarriers of an MIMO transmission frequency band, and then the second communications node demodulates, by using the first channel estimate, a signal sent by the first communications node.

A subcarrier of each OFDM symbol of a second field is used to transmit useful information instead of carrying a reference signal. Therefore, only a first field is actually used as an overhead for channel estimation. A quantity of OFDM symbols of the first field is less than a quantity of spatial flows. Therefore, compared with the prior art, the technical solution provided in this embodiment of the present invention greatly reduces a signaling overhead and improves resource utilization.

In a specific embodiment, for example, a quantity of spatial flows is N; a signal packet sent by a first communications node includes L OFDM symbols, and a first field and a second field respectively include $L_1$ and $L_2$ OFDM symbols, that is, $L_1+L_2=L$, where L≤N subcarriers in each OFDM symbol of the first field and the second field sequentially correspond to different spatial flows, and spatial flows corresponding to subcarriers of a same location in different OFDM symbols are different. In this way, subcarriers corresponding to all spatial flows in each OFDM symbol are mutually orthogonal; for channel estimation, channel estimates, of all spatial flows, on subcarriers corresponding to all the spatial flows may be directly obtained; for useful information carried by the second field, it is equivalent to that the useful information is transmitted by means of OFDMA.

If distribution pattern sets of locations of subcarriers corresponding to all spatial flows in all OFDM symbols of the first field and the second field are respectively represented as $\pi_1$ and $\pi_2$ and a distribution pattern set of locations of subcarriers corresponding to all spatial flows in N OFDM symbols of a subcarrier interleaving solution shown in FIG. 1 is represented as Φ, both $\pi_1$ and $\pi_2$ are a subset of Φ, and an intersection set between $\pi_1$ and $\pi_2$ is empty, that is, π1∩π2=φ, where φ represents an empty set. Particularly, when L=N, $\pi_1 \cup \pi_2$=Φ, that is, in the entire first field and the entire second field, subcarriers corresponding to each spatial flow are distributed to locations of all subcarriers of an MIMO transmission frequency band.

Figure 4:
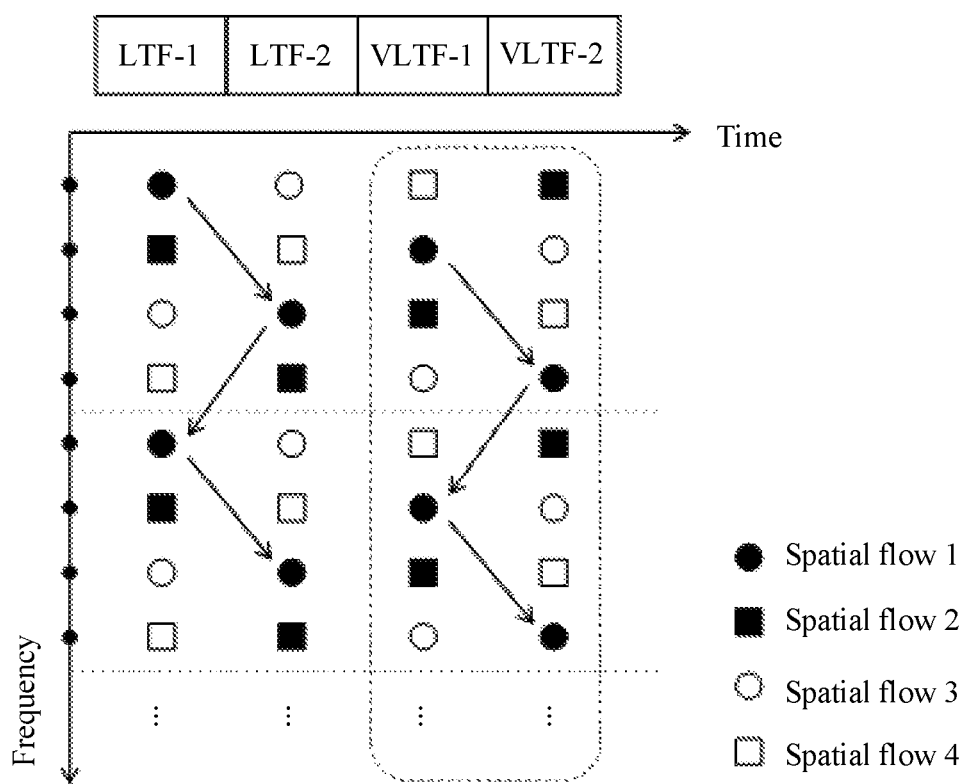
FIG. 4 is a distribution diagram of locations of subcarriers corresponding to all spatial flows (N=4) in a first field and a second field according to an embodiment of the present invention.

When L<N, in the entire first field and the entire second field, subcarriers corresponding to each spatial flow are not distributed to locations of all subcarriers of an MIMO transmission frequency band. Preferably, selection of $\pi_1$ and $\pi_2$ should ensure that all subcarriers corresponding to all spatial flows in the first field, the entire first field, and the entire second field are distributed as evenly as possible in the entire MIMO transmission frequency band. FIG. 3 is a distribution diagram of locations of subcarriers corresponding to all spatial flows (N=2) in a first field and a second field according to an embodiment of the present invention. FIG. 4 is a distribution diagram of locations of subcarriers corresponding to all spatial flows (N=4) in a first field and a second field according to an embodiment of the present invention. Apparently, in the embodiments shown in FIG. 3 and FIG. 4, L=N.

In the embodiment shown in FIG. 3, both a first field and a second field include only one OFDM symbol, and the two OFDM symbols are respectively represented as LTF-1 and VLTF-1, and distribution patterns of locations of subcarriers corresponding to all spatial flows are respectively represented by using Ψ(1) and Ψ(2), that is $\pi_1=\{\Psi(1)\}$, $\pi_2=\{\Psi(2)\}$, and π=Φ={Ψ(1), Ψ(2)}.

In the embodiment shown in FIG. 4, a first field of an HE-LTF includes two OFDM symbols: LTF-1 and LTF-2, and distribution patterns of locations of subcarriers corresponding to all spatial flows are respectively Ψ(1) and Ψ(3). A second field also includes two OFDM symbols: VLTF-1 and VLTF-2, and distribution patterns of locations of subcarriers corresponding to all spatial flows are respectively Ψ(2) and Ψ(4).. Therefore, in this embodiment, $\pi_1=\{\Psi(1), \Psi(3)\}$, $\pi_2=\{\Psi(2)\ \Psi(4)\}$, and π=Φ={Ψ(1), Ψ(2), Ψ(3), Ψ(4)}. Using a spatial flow 1 as an example, locations of subcarriers corresponding to the spatial flow 1 in LTF-1 and LTF-2 are respectively represented as:

1, 0, 0, 0, 1, 0, 0, 0, 1, 0, 0, 0, . . . and 0, 0, 1, 0, 0, 0, 1, 0, 0, 0, 1, 0, . . . .

"1" and "0" respectively indicate that the spatial flow has or does not have a corresponding subcarrier in this location. Therefore, locations of subcarriers corresponding to the spatial flow 1 in a first field are: 1, 0, 1, 0, 1, 0, 1, 0, 1, 0, 1, 0, . . . , that is, the subcarriers are evenly distributed in the entire MIMO transmission frequency band; locations of subcarriers corresponding to the spatial flow 1 in a second field are complementary to those in the first field, that is, 0, 1, 0, 1, 0, 1, 0, 1, 0, 1, 0, . . . . Therefore, by means of combining subcarriers corresponding to the spatial flow 1 in the two fields, subcarriers corresponding to the spatial flow 1 in the entire first field and the entire second field are distributed to locations of all subcarriers of the MIMO transmission frequency band.

A vertical coordinate in FIG. 3 and FIG. 4 also represents distribution of locations of subcarriers corresponding to all spatial flows in the entire first field and the entire second field. A symbol "•" in FIG. 3 and FIG. 4 indicates that a spatial flow has a corresponding subcarrier in a corresponding location.

Figure 5:
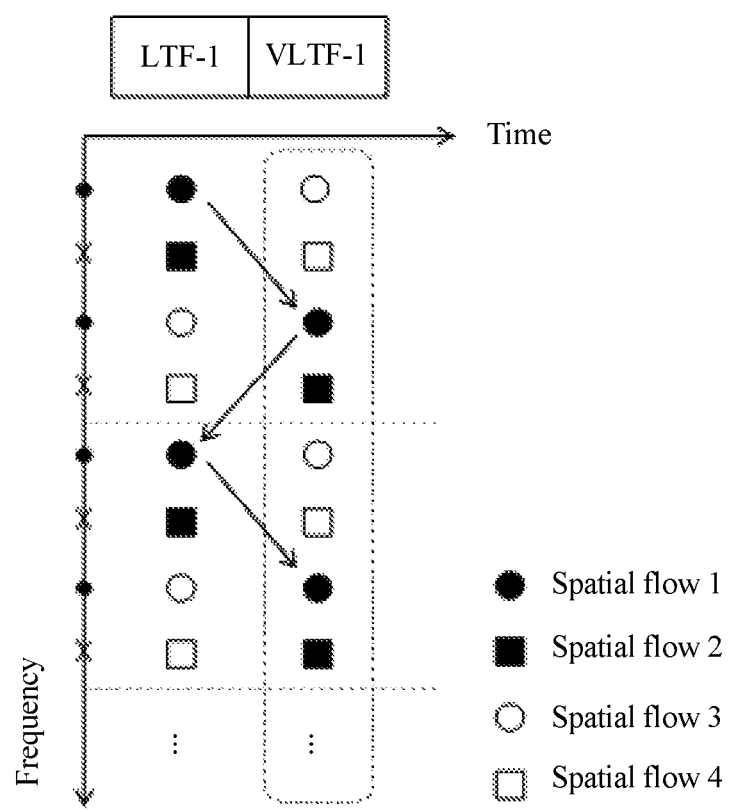
FIG. 5 is another distribution diagram of locations of subcarriers corresponding to all spatial flows (N=4) in a first field and a second field according to an embodiment of the present invention.

FIG. 5 is another distribution diagram of locations of subcarriers corresponding to all spatial flows (N=4) in a first field and a second field according to an embodiment of the present invention. In this embodiment, L=2, both the first field and the second field include only one OFDM symbol: LTF-1 and VLTF-1, which respectively uses subcarrier distribution patterns Ψ(1) and Ψ(3) of spatial flows. Using a spatial flow 1 as an example, locations of subcarriers corresponding to the spatial flow 1 in LTF-1 are: 1, 0, 0, 0, 1, 0, 0, 0, 1, 0, 0, 0, . . . , that is, a subcarrier appears at intervals of three empty locations, and locations of corresponding subcarriers in the entire first field and the entire second field are: 1, 0, 1, 0, 1, 0, 1, 0, 1, 0, 1, 0, . . . . A symbol "x" in FIG. 5 indicates that a spatial flow does not have a corresponding subcarrier in a corresponding location.

Figure 6:
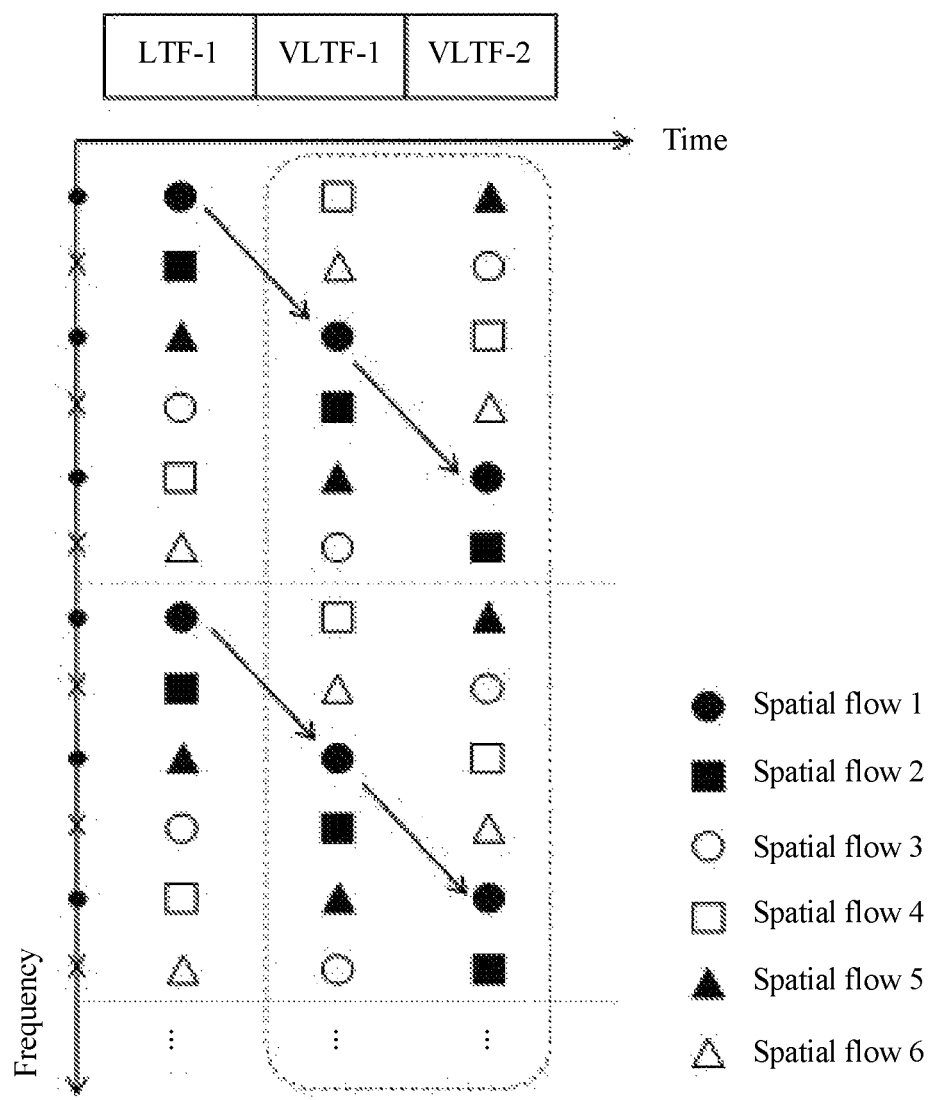
FIG. 6 is a distribution diagram of locations of subcarriers corresponding to all spatial flows (N=6) in a first field and a second field according to an embodiment of the present invention.
Figure 7:
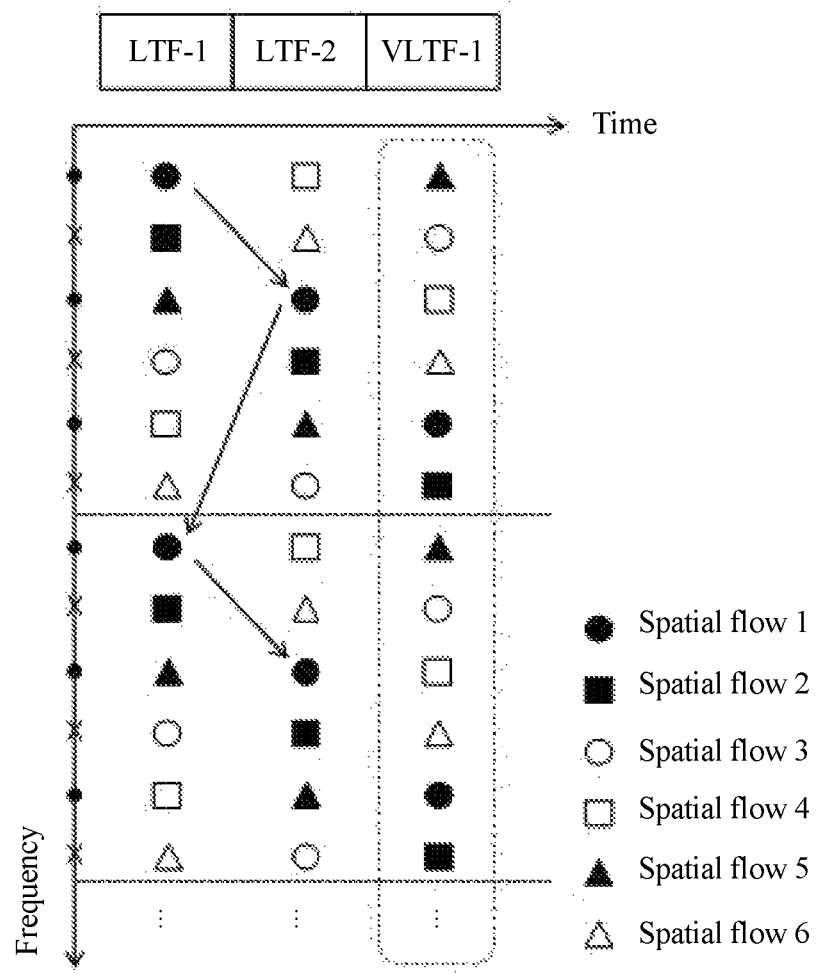
FIG. 7 is another distribution diagram of locations of subcarriers corresponding to all spatial flows (N=6) in a first field and a second field according to an embodiment of the present invention.

FIG. 6 is a distribution diagram of locations of subcarriers corresponding to all spatial flows (N=6) in a first field and a second field according to an embodiment of the present invention. FIG. 7 is another distribution diagram of locations of subcarriers corresponding to all spatial flows (N=6) in a first field and a second field according to an embodiment of the present invention. FIG. 6 and FIG. 7 respectively show two different embodiments in which $L=^3$. In the two embodiments, π={Ψ(1), Ψ(3), Ψ(5)} is selected, and a difference is that $\pi_1$ and $\pi_2$ are different. Using a spatial flow 1 as an example, in FIG. 6, locations of subcarriers corresponding to the spatial flow 1 in the first field and the second field are respectively: 1, 0, 0, 0, 0, 0, 1, 0, 0, 0, 0, 0, . . . and 1, 0, 1, 0, 0, 0, 1, 0, 1, 0, 0, 0, . . . . Contrary to FIG. 6, in FIG. 7, locations of subcarriers corresponding to the spatial flow 1 in the first field and the second field are respectively: 1, 0, 1, 0, 0, 0, 1, 0, 1, 0, 0, 0, . . . and 1, 0, 0, 0, 0, 0, 1, 0, 0, 0, 0, 0, . . . .

Figure 8:
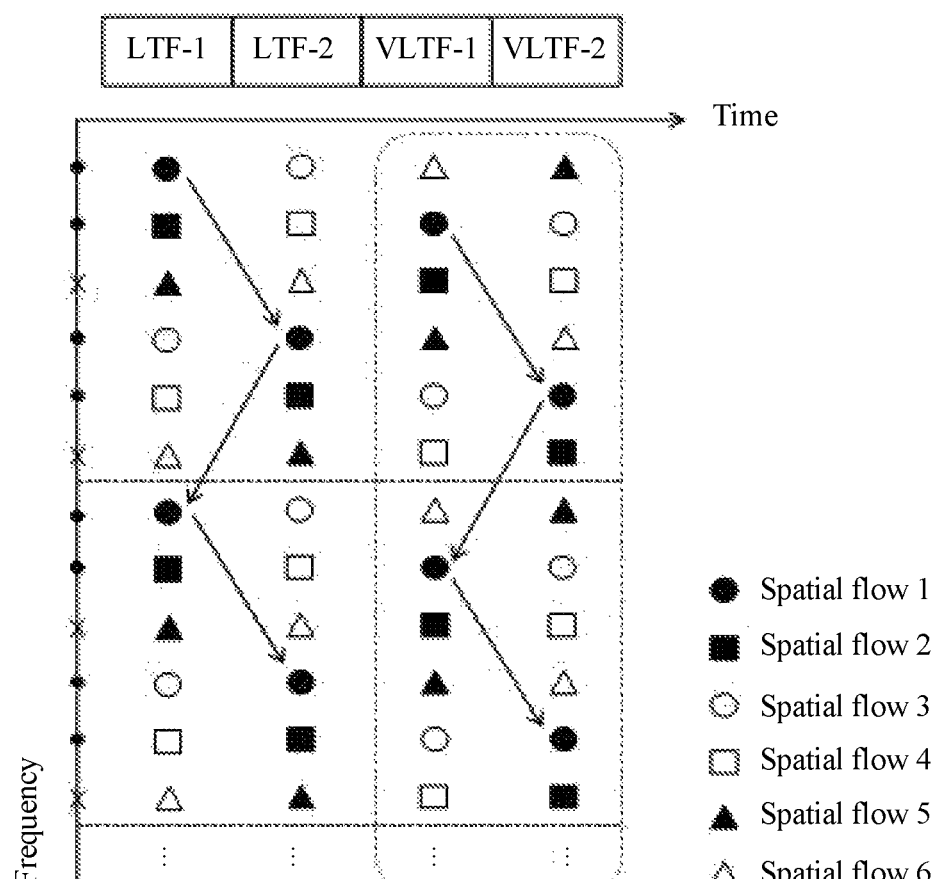
FIG. 8 is still another distribution diagram of locations of subcarriers corresponding to all spatial flows (N=6) in a first field and a second field according to an embodiment of the present invention.

FIG. 8 is still another distribution diagram of locations of subcarriers corresponding to all spatial flows (N=6) in a first field and a second field according to an embodiment of the present invention. In this embodiment, $N=^6$, and $L=^4$, where $\pi_1=\{\Psi(1), \Psi(4)\}$ and $\pi_2=\{\Psi(2), \Psi(5)\}$. Therefore, using a spatial flow 1 as an example, locations of subcarriers corresponding to spatial flows in the first field and the second field are respectively:

1, 0, 0, 1, 0, 0, 1, 0, 0, 1, 0, 0, . . . and 0, 1, 0, 0, 1, 0, 0, 1, 0, 0, 1, 0, . . . .

Locations of subcarriers corresponding to the spatial flow 1 in the entire first field and the entire second field are: 1, 1, 0, 1, 1, 0, 1, 1, 0, 1, 1, 0, . . . .

In the foregoing specific embodiment, all subcarriers in each OFDM symbol of the first field and the second field sequentially correspond to different spatial flows. Optionally, all subcarriers in each OFDM symbol of the first field and the second field may sequentially correspond to different spatial flow groups. A quantity N of spatial flows is still used as an example for description. A signal packet sent by a first communications node includes L OFDM symbols in total, and a first field and a second field respectively include $L_1$ and $L_2$ OFDM symbols, that is, $L_1+L_2=L$, where $L \leq N$, $L_1=mK$, $L_2=nK$, and $K \geq 2$. All subcarriers in each OFDM symbol of the first field and the second field sequentially correspond to different spatial flow groups, spatial flow groups corresponding to subcarriers of a same location in different OFDM symbols are different, and the spatial flow group includes K spatial flows. In the first field, after undergoing orthogonal transform, the K spatial flows of each spatial flow group are sequentially transmitted by using subcarriers that are corresponding to the spatial flow group and that are of K OFDM symbols of the first field. In the second field, after undergoing orthogonal transform, the K spatial flows of each spatial flow group are sequentially transmitted by using subcarriers that are corresponding to the spatial flow group and that are of K OFDM symbols of the second field.

In this way, subcarriers corresponding to all spatial flow groups in each OFDM symbol are mutually orthogonal; in addition, at a transmit end, after undergoing orthogonal transform, spatial flows in all spatial flow groups are sequentially transmitted by using subcarriers that are corresponding to the spatial flow groups and that are of K OFDM symbols, so that after undergoing the orthogonal transform, a receive end can obtain through separation all spatial flows in all spatial flow groups from the K OFDM symbols. Therefore, all spatial flows in all spatial flow groups are mutually orthogonal. In this way, for channel estimation, channel estimates, of all spatial flows, on subcarriers corresponding to all the spatial flows may be directly obtained.

Figure 9:
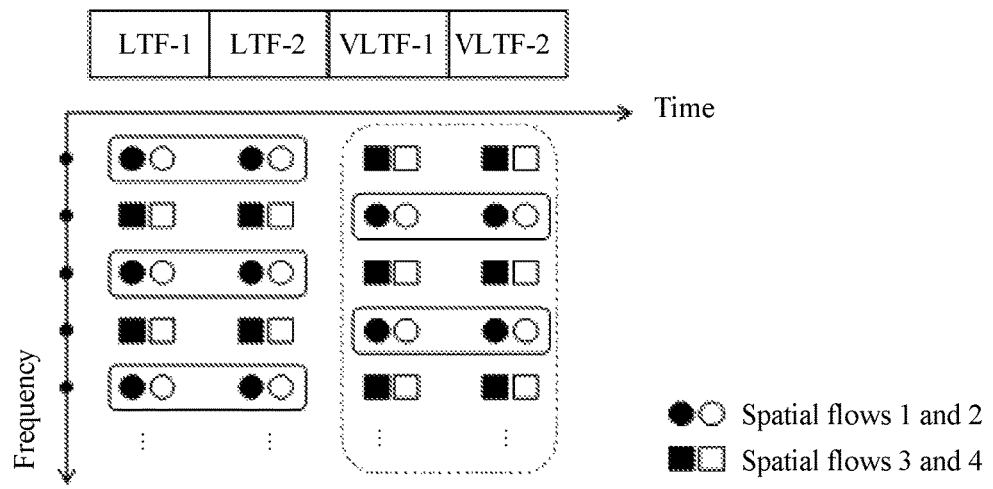
FIG. 9 is still another distribution diagram of locations of subcarriers corresponding to all spatial flows (N=4) in a first field and a second field according to an embodiment of the present invention.

FIG. 9 is still another distribution diagram of locations of subcarriers corresponding to all spatial flows (N=4) in a first field and a second field according to an embodiment of the present invention. In this embodiment, m=1, n=1, and K=2. Therefore, both the first field and the second field include two OFDM symbols: LTF-1 and LTF-2, and VLTF-1 and VLTF-2. Spatial flows 1 and 2 form a spatial flow group A, and spatial flows 3 and 4 form a spatial flow group B. In the two OFDM symbols of the first field, the spatial flow group A corresponds to subcarriers whose location sequence numbers are odd numbers, and the spatial flow group B corresponds to subcarriers whose location sequence numbers are even numbers. In the two OFDM symbols of the second field, the spatial flow group A corresponds to subcarriers whose location sequence numbers are even numbers, and the spatial flow group B corresponds to subcarriers whose location sequence numbers are odd numbers. Therefore, using the spatial flow group A as an example, by means of combining subcarriers corresponding to the spatial flows 1 and 2 in the two fields, the subcarriers corresponding to the spatial flows 1 and 2 in the entire first field and the entire second field are distributed to locations of all subcarriers of an MIMO transmission frequency band.

Figure 10:
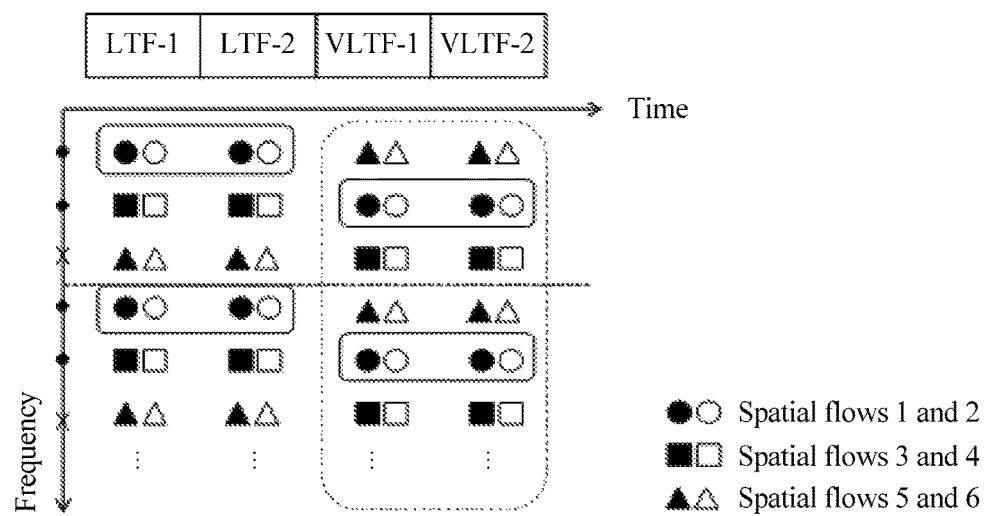
FIG. 10 is yet another distribution diagram of locations of subcarriers corresponding to all spatial flows (N=6) in a first field and a second field according to an embodiment of the present invention.

FIG. 10 is yet another distribution diagram of locations of subcarriers corresponding to all spatial flows (N=6) in a first field and a second field according to an embodiment of the present invention. In this embodiment, m=1, n=1, and K=2. Therefore, both the first field and the second field include two OFDM symbols: LTF-1 and LTF-2, and VLTF-1 and VLTF-2. Spatial flows 1 and 2 form a spatial flow group A, spatial flows 3 and 4 form a spatial flow group B, and spatial flows 5 and 6 form a spatial flow group C. In the two OFDM symbols of the first field, location sequence numbers of subcarriers corresponding to the spatial flow groups A, B, and C are respectively: 1, 4, 7 . . . , 2, 5, 8 . . . , and 3, 6, 9 . . . . In the two OFDM symbols of the second field, location sequence numbers of subcarriers corresponding to the spatial flow groups A, B, and C are respectively: 2, 5, 8 . . . , 3, 6, 9 . . . , and 1, 4, 7 . . . . Therefore, using the spatial flow group A as an example, by means of combining subcarriers corresponding to the spatial flows 1 and 2 in the two fields, locations of the subcarriers corresponding to the spatial flows 1 and 2 in the entire first field and the entire second field are: 1, 1, 0, 1, 1, 0, 1, 1, 0, 1, 1, 0, . . . .

Figure 11:
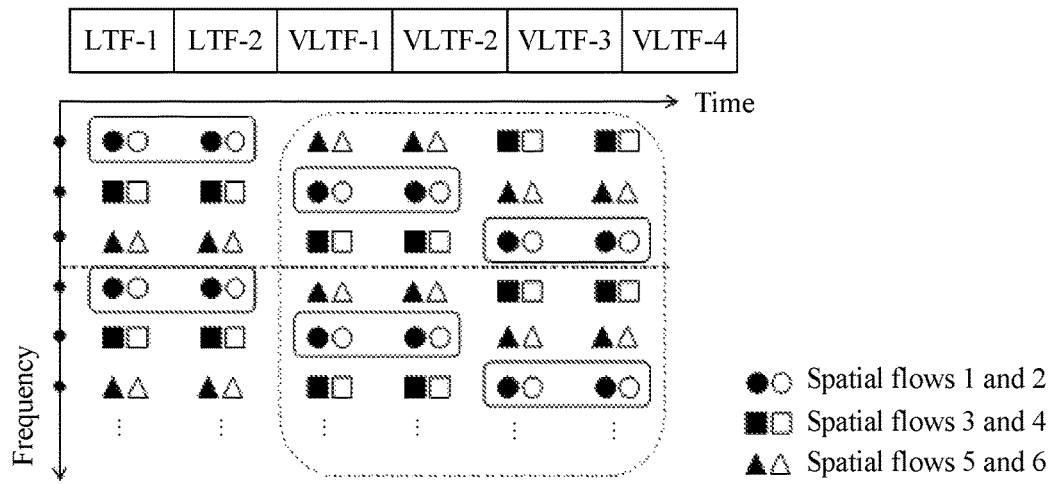
FIG. 11 is still yet another distribution diagram of locations of subcarriers corresponding to all spatial flows (N=6) in a first field and a second field according to an embodiment of the present invention.

FIG. 11 is still yet another distribution diagram of locations of subcarriers corresponding to all spatial flows (N=6) in a first field and a second field according to an embodiment of the present invention. In this embodiment, m=1, n=2, and K=2. Therefore, the first field includes two OFDM symbols: LTF-1 and LTF-2; the second field includes four OFDM symbols: VLTF-1, VLTF-2, VLTF-3, and VLTF-4. Spatial flows 1 and 2 form a spatial flow group A, spatial flows 3 and 4 form a spatial flow group B, and spatial flows 5 and 6 form a spatial flow group C. In the two OFDM symbols of the first field, location sequence numbers of subcarriers corresponding to the spatial flow groups A, B, and C are respectively: 1, 4, 7 . . . , 2, 5, 8 . . . , and 3, 6, 9 . . . . In VLTF-1 and VLTF-2 symbols of the second field, location sequence numbers of subcarriers corresponding to the spatial flow groups A, B, and C are respectively: 2, 5, 8 . . . , 3, 6, 9 . . . , and 1, 4, 7 . . . . In VLTF-3 and VLTF-4 symbols of the second field, location sequence numbers of subcarriers corresponding to the spatial flow groups A, B, and C are respectively: 3, 6, 9 . . . , 1, 4, 7 . . . , and 2, 5, 8 . . . . Therefore, using the spatial flow group A as an example, by means of combining subcarriers corresponding to the spatial flows 1 and 2 in the two fields, the subcarriers corresponding to the spatial flows 1 and 2 in the entire first field and the entire second field are distributed to locations of all subcarriers of an MIMO transmission frequency band.

Figure 12:
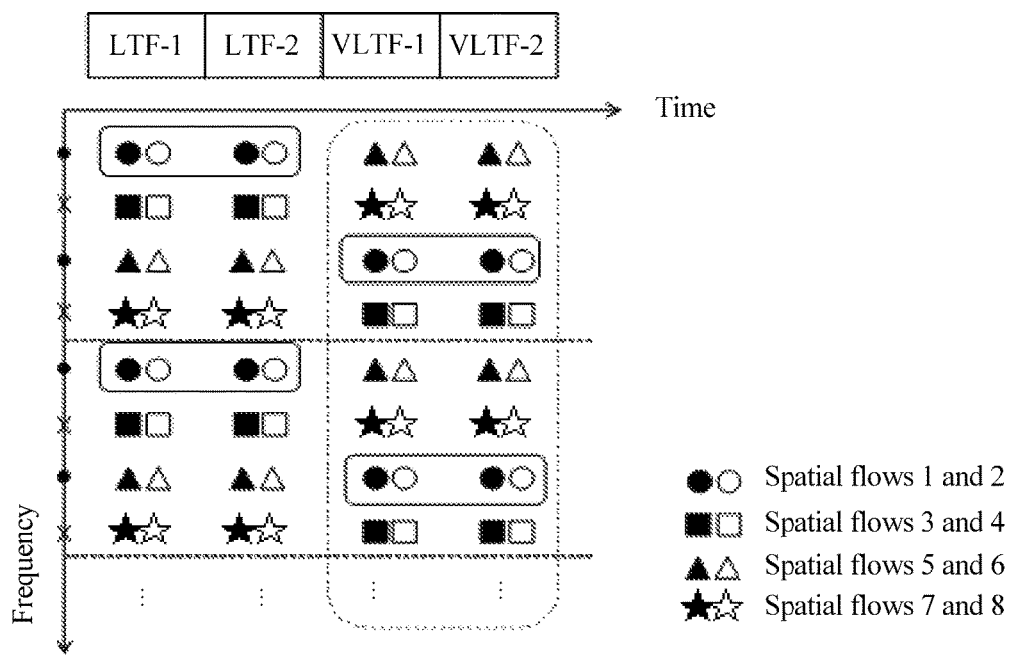
FIG. 12 is a distribution diagram of locations of subcarriers corresponding to all spatial flows (N=8) in a first field and a second field according to an embodiment of the present invention.

FIG. 12 is a distribution diagram of locations of subcarriers corresponding to all spatial flows (N=8) in a first field and a second field according to an embodiment of the present invention. In this embodiment, m=1, n=1, and K=2. Therefore, both the first field and the second field include two OFDM symbols: LTF-1 and LTF-2, and VLTF-1 and VLTF-2. Spatial flows 1 and 2 form a spatial flow group A, spatial flows 3 and 4 form a spatial flow group B, spatial flows 5 and 6 form a spatial flow group C, and spatial flows 7 and 8 form a spatial flow group D. In the two OFDM symbols of the first field, location sequence numbers of subcarriers corresponding to the spatial flow groups A, B, C, and D are respectively: 1, 5, 9 . . . , 2, 6, 10 . . . , 3, 7, 11 . . . , and 4, 8, 12 . . . . In the two OFDM symbols of the second field, location sequence numbers of subcarriers corresponding to the spatial flow groups A, B, C, and D are respectively: 3, 7, 11 . . . , 4, 8, 12 . . . , 1, 5, 9 . . . , and 2, 6, 10 . . . . Therefore, using the spatial flow group A as an example, by means of combining subcarriers corresponding to the spatial flows 1 and 2 in the two fields, the subcarriers corresponding to the spatial flows 1 and 2 in the entire first field and the entire second field are distributed to locations of all subcarriers of an MIMO transmission frequency band.

Figure 13:
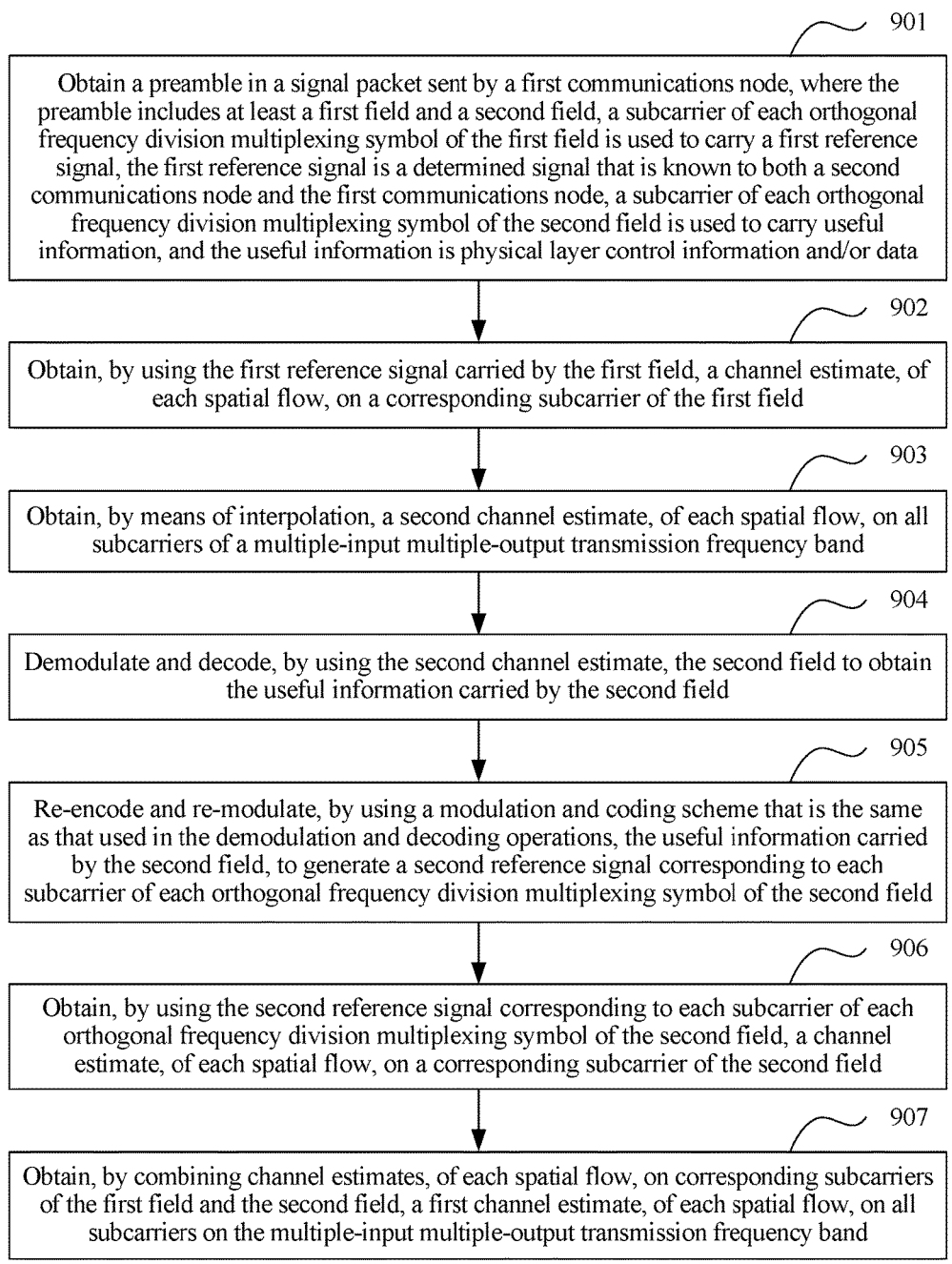
FIG. 13 is another flowchart of a channel estimation method according to an embodiment of the present invention.

FIG. 13 is another flowchart of a channel estimation method according to an embodiment of the present invention. Based on the method shown in FIG. 2, a solution of obtaining, by an access point by using a first reference signal carried by the first field and useful information carried by the second field in an access point, a first channel estimate, of each spatial flow, on all subcarriers of an MIMO transmission frequency band is limited in the channel estimation method shown in FIG. 13. As shown in FIG. 13, the channel estimation method provided in this embodiment of the present invention includes:

901. Obtain a preamble in a signal packet sent by a first communications node, where the preamble includes at least a first field and a second field, a subcarrier of each orthogonal frequency division multiplexing OFDM symbol of the first field is used to carry a first reference signal, the first reference signal is a predetermined signal that is known to both a second communications node and the first communications node, a subcarrier of each OFDM symbol of the second field is used to carry useful information, and the useful information is physical layer control information and/or data.

902. Obtain, by using the first reference signal carried by the first field, a channel estimate, of each spatial flow, on a corresponding subcarrier in the first field.

903. Obtain, by means of interpolation, a second channel estimate, of each spatial flow, on all subcarriers of an MIMO transmission frequency band.

904. Demodulate and decode, by using the second channel estimate, the second field to obtain the useful information carried by the second field.

905. Re-encode and re-modulate, by using a modulation and coding scheme that is the same as that used in the demodulation and decoding operations, the useful information carried by the second field, to generate a second reference signal corresponding to each subcarrier of each OFDM symbol of the second field.

906. Obtain, by using the second reference signal corresponding to each subcarrier of each OFDM symbol of the second field, a channel estimate, of each spatial flow, on a corresponding subcarrier in the second field.

907. Obtain, by combining channel estimates, of each spatial flow, on corresponding subcarriers in the first field and the second field, a first channel estimate, of each spatial flow, on all subcarriers of the MIMO transmission frequency band.

For step 901, refer to explanations and descriptions of step 201 in the method embodiment shown in FIG. 2.

Optionally, for example, the first communications node may be a STA, user equipment, or an access point; for example, the second communications node may be a STA, an access point, or user equipment. A second communications node obtains, by using a reference signal carried by a first field of a preamble, a channel estimate, of each spatial flow, on a corresponding subcarrier in the first field. A quantity of OFDM symbols of the first field is less than a quantity of spatial flows. Therefore, a second channel estimate, of each spatial flow, on all subcarriers of an MIMO transmission frequency band is obtained by means of interpolation, where a variety of mature interpolation algorithms in an existing signal processing technology may be used for the interpolation.

Then, the second communications node demodulates (for example, operations such as constellation de-mapping) and decodes, by using the second channel estimate, of each spatial flow, on all subcarriers of an MIMO transmission frequency band obtained by using the foregoing steps, the second field to obtain useful information carried by the second field. Using a second field used to transmit physical layer control information as an example, BPSK modulation and convolutional coding whose encoding rate is 1/2 are generally used. In this step, a receiver extracts a channel estimate on subcarriers corresponding to each spatial flow from channel estimates, of each spatial flow, on all subcarriers of the MIMO transmission frequency band; and performs BPSK demodulation and channel decoding on a signal of each spatial flow to obtain a physical layer control information bit carried by the second field.

Then, the information bit obtained by means of the foregoing demodulation and decoding processing is re-encoded and re-modulated (for example, operations such as constellation mapping) by using a same modulation and coding scheme to generate a reference signal corresponding to each subcarrier of the second field. Alternatively, a reference signal may be obtained by directly re-modulating, by using a same modulation scheme, hard-decision bits obtained in a second field demodulation process. Still using a second field used to transmit physical layer control information as an example, BPSK modulation and convolutional code whose encoding rate is 1/2 are used, and although a signal-to-noise ratio is excessively low, decoding may succeed. Therefore, there is no difference between a reference signal obtained by means of re-encoding and re-modulation after decoding of a receive end and a reference signal directly sent by a transmit end. Therefore, it is ensured that, in the present invention, performance of channel estimation is the same as that in the prior art while an advantage of greatly reducing an overhead is obtained. When a signal-to-noise ratio is relatively high, a reference signal corresponding to each subcarrier of the second field may be obtained by directly re-modulating hard-decision bits obtained by means of demodulation, so that an operation of channel estimation is simplified.

Then, the second communications node obtains, by using the reference signal corresponding to each subcarrier of the second field, a channel estimate, of each spatial flow, on a corresponding subcarrier in the second field. Subcarrier distribution patterns of spatial flows used by the first field and the second field do not overlap each other. Therefore, when L=N, a receiver obtains, by combining channel estimates, of each spatial flow, on corresponding subcarriers in the first field and the second field, a channel estimate, of each spatial flow, on all subcarriers of the MIMO transmission frequency band; when L<N, a receiver obtains, by combining channel estimates, of each spatial flow, on corresponding subcarriers in the first field and the second field, and by means of secondary interpolation, a channel estimate, of each spatial flow, on all subcarriers of the MIMO transmission frequency band. By this time, the second communications node may demodulate, by using an uplink channel estimate, a signal sent by the user equipment.

Figure 14:
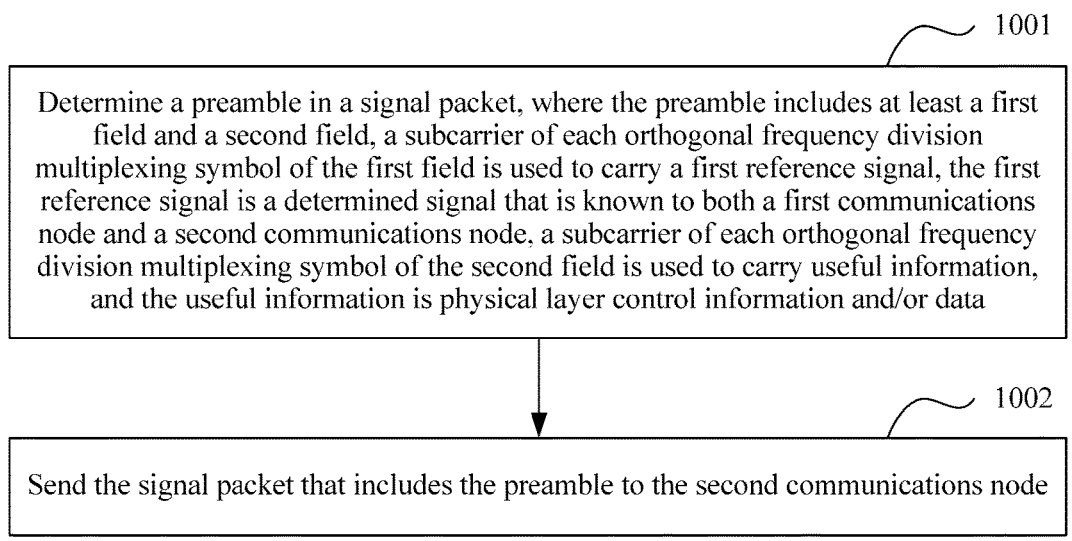
FIG. 14 is still another flowchart of a channel estimation method according to an embodiment of the present invention.

FIG. 14 is still another flowchart of a channel estimation method according to an embodiment of the present invention. As shown in FIG. 14, the channel estimation method provided in this embodiment of the present invention includes:

1001. Determine a preamble in a signal packet, where the preamble includes at least a first field and a second field, a subcarrier of each orthogonal frequency division multiplexing OFDM symbol of the first field is used to carry a first reference signal, the first reference signal is a predetermined signal that is known to both a first communications node and a second communications node, a subcarrier of each OFDM symbol of the second field is used to carry useful information, and the useful information is physical layer control information and/or data.

1002. Send the signal packet that includes the preamble to the second communications node.

This embodiment of the present invention may be executed by a first communications node. Optionally, for example, the first communications node may be user equipment or an access point; for example, the second communications node may be an access point or user equipment. After determining a preamble in an uplink packet, user equipment sends the uplink packet that includes the preamble to an access point. The preamble includes a first field and a second field, a subcarrier of each orthogonal frequency division multiplexing OFDM symbol of the first field is used to carry a reference signal, and a subcarrier of each OFDM symbol of the second field is used to carry useful information. Compared with the prior art, the technical solution provided in this embodiment of the present invention greatly reduces a signaling overhead and improves resource utilization.

Figure 15:
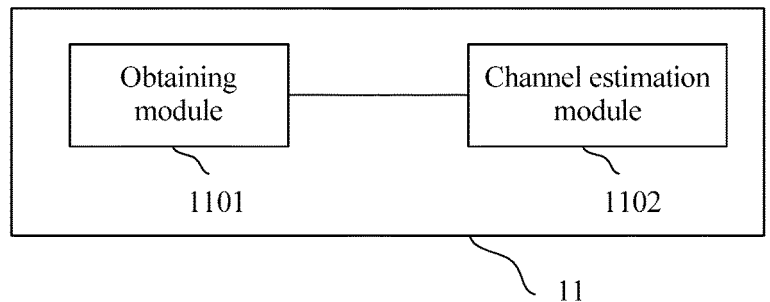
FIG. 15 is a schematic structural diagram of a second communications node according to an embodiment of the present invention.

FIG. 15 is a schematic structural diagram of a second communications node according to an embodiment of the present invention. As shown in FIG. 15, the second communications node 11 provided in this embodiment of the present invention includes:

an obtaining module 1101, configured to obtain a preamble in a signal packet sent by a first communications node, where the preamble includes at least a first field and a second field, a subcarrier of an orthogonal frequency division multiplexing OFDM symbol of the first field is used to carry a first reference signal, the first reference signal is a predetermined signal that is known to both the second communications node and the first communications node, a subcarrier of an OFDM symbol of the second field is used to carry useful information, and the useful information is physical layer control information and/or data; and a channel estimation module 1102, configured to obtain, by using the first field and the second field in the preamble obtained by the obtaining module, a first channel estimate, of each spatial flow, on all subcarriers of a multiple-input multiple-output MIMO transmission frequency band.

The second communications node 11 provided in this embodiment of the present invention may be used to execute the technical solution of the method embodiment shown in FIG. 2. Implementation principles thereof are similar, and details are not described herein again. Compared with the prior art, the technical solution provided in this embodiment of the present invention greatly reduces a signaling overhead and improves resource utilization.

Optionally, all subcarriers in each OFDM symbol of the first field and the second field sequentially correspond to different spatial flows, and spatial flows corresponding to subcarriers of a same location in different OFDM symbols are different. Optionally, all subcarriers in each OFDM symbol of the first field and the second field sequentially correspond to different spatial flow groups, spatial flow groups corresponding to subcarriers of a same location in different OFDM symbols are different, and the spatial flow group includes K spatial flows. In the first field, after undergoing orthogonal transform, the K spatial flows of each spatial flow group are sequentially transmitted by using subcarriers that are corresponding to the spatial flow group and that are of K OFDM symbols of the first field. In the second field, after undergoing orthogonal transform, the K spatial flows of each spatial flow group are sequentially transmitted by using subcarriers that are corresponding to the spatial flow group and that are of K OFDM symbols of the second field. Optionally, the subcarrier is a subcarrier except a zero-frequency subcarrier and a protection subcarrier that is used to suppress adjacent channel leakage of the MIMO transmission frequency band.

Optionally, the channel estimation module 1102 is specifically configured to: obtain, by using the first reference signal carried by the first field, a channel estimate, of each spatial flow, on a corresponding subcarrier in the first field;

obtain, by means of interpolation, a second channel estimate, of each spatial flow, on all subcarriers of the MIMO transmission frequency band;

demodulate and decode, by using the second channel estimate, the second field to obtain the useful information carried by the second field;

re-encode and re-modulate, by using a modulation and coding scheme that is the same as that used in the demodulation and decoding operations, the useful information carried by the second field, to generate a second reference signal corresponding to each subcarrier of each OFDM symbol of the second field;

obtain, by using the second reference signal corresponding to each subcarrier of each OFDM symbol of the second field, a channel estimate, of each spatial flow, on a corresponding subcarrier in the second field; and obtain, by combining channel estimates, of each spatial flow, on corresponding subcarriers in the first field and the second field, the first channel estimate, of each spatial flow, on all subcarriers of the MIMO transmission frequency band.

Figure 16:
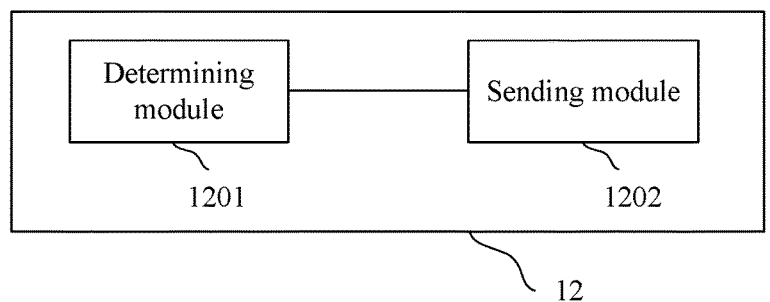
FIG. 16 is a schematic structural diagram of a first communications node according to an embodiment of the present invention.

FIG. 16 is a schematic structural diagram of a first communications node according to an embodiment of the present invention. As shown in FIG. 16, the first communications node 12 provided in this embodiment of the present invention includes:

a determining module 1201, configured to determine a preamble in a signal packet, where the preamble includes at least a first field and a second field, a subcarrier of an orthogonal frequency division multiplexing OFDM symbol of the first field is used to carry a first reference signal, the first reference signal is a predetermined signal that is known to both a second communications node and the first communications node, a subcarrier of an OFDM symbol of the second field is used to carry useful information, and the useful information is physical layer control information and/or data; and a sending module 1202, configured to send the signal packet that includes the preamble to the second communications node.

The first communications node 12 provided in this embodiment of the present invention may be configured to execute the technical solution of the method embodiment shown in FIG. 14. Implementation principles thereof are similar, and details are not described herein again. Compared with the prior art, the technical solution provided in this embodiment of the present invention greatly reduces a signaling overhead and improves resource utilization.

Figure 17:
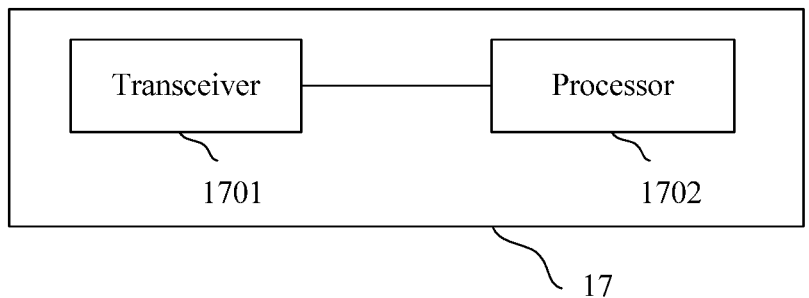
FIG. 17 is another schematic structural diagram of a second communications node according to an embodiment of the present invention.

FIG. 17 is another schematic structural diagram of a second communications node according to an embodiment of the present invention. As shown in FIG. 17, the second communications node 17 provided in this embodiment of the present invention includes:

a transceiver 1701, configured to obtain a preamble in a signal packet sent by a first communications node, where the preamble includes at least a first field and a second field, a subcarrier of an orthogonal frequency division multiplexing OFDM symbol of the first field is used to carry a first reference signal, the first reference signal is a predetermined signal that is known to both the second communications node and the first communications node, a subcarrier of an OFDM symbol of the second field is used to carry useful information, and the useful information is physical layer control information and/or data; and a processor 1702, configured to obtain, by using the first field and the second field in the preamble obtained by the transceiver 1701, a first channel estimate, of each spatial flow, on all subcarriers of a multiple-input multiple-output MIMO transmission frequency band.

The second communications node 17 provided in this embodiment of the present invention may be used to execute the technical solution of the method embodiment shown in FIG. 2. Implementation principles thereof are similar, and details are not described herein again. Compared with the prior art, the technical solution provided in this embodiment of the present invention greatly reduces a signaling overhead and improves resource utilization.

Optionally, all subcarriers in each OFDM symbol of the first field and the second field sequentially correspond to different spatial flows, and spatial flows corresponding to subcarriers of a same location in different OFDM symbols are different. Optionally, all subcarriers in each OFDM symbol of the first field and the second field sequentially correspond to different spatial flow groups, spatial flow groups corresponding to subcarriers of a same location in different OFDM symbols are different, and the spatial flow group includes K spatial flows. In the first field, after undergoing orthogonal transform, the K spatial flows of each spatial flow group are sequentially transmitted by using subcarriers that are corresponding to the spatial flow group and that are of K OFDM symbols of the first field. In the second field, after undergoing orthogonal transform, the K spatial flows of each spatial flow group are sequentially transmitted by using subcarriers that are corresponding to the spatial flow group and that are of K OFDM symbols of the second field. Optionally, the subcarrier is a subcarrier except a zero-frequency subcarrier and a protection subcarrier that is used to suppress adjacent channel leakage of the MIMO transmission frequency band.

Optionally, the processor 1702 is specifically configured to:

obtain, by using the first reference signal carried by the first field, a channel estimate, of each spatial flow, on a corresponding subcarrier in the first field;

obtain, by means of interpolation, a second channel estimate, of each spatial flow, on all subcarriers of the MIMO transmission frequency band;

demodulate and decode, by using the second channel estimate, the second field to obtain the useful information carried by the second field;

re-encode and re-modulate, by using a modulation and coding scheme that is the same as that used in the demodulation and decoding operations, the useful information carried by the second field, to generate a second reference signal corresponding to each subcarrier of each OFDM symbol of the second field;

obtain, by using the second reference signal corresponding to each subcarrier of each OFDM symbol of the second field, a channel estimate, of each spatial flow, on a corresponding subcarrier in the second field; and obtain, by combining channel estimates, of each spatial flow, on corresponding subcarriers in the first field and the second field, the first channel estimate, of each spatial flow, on all subcarriers of the MIMO transmission frequency band.

Figure 18:
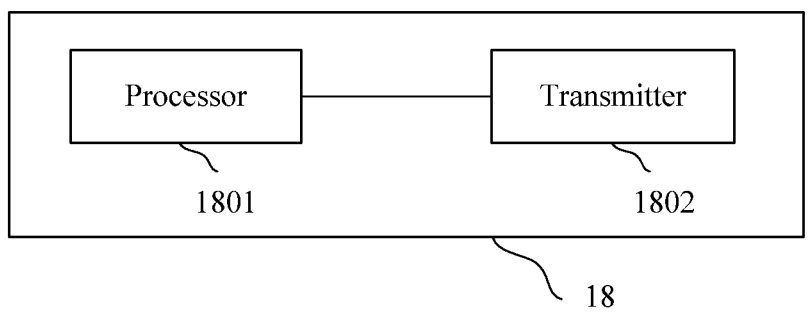
FIG. 18 is another schematic structural diagram of a first communications node according to an embodiment of the present invention.

FIG. 18 is another schematic structural diagram of a first communications node according to an embodiment of the present invention. As shown in FIG. 18, the first communications node 18 provided in this embodiment of the present invention includes:

a processor 1801, configured to determine a preamble in a signal packet, where the preamble includes at least a first field and a second field, a subcarrier of an orthogonal frequency division multiplexing OFDM symbol of the first field is used to carry a first reference signal, the first reference signal is a predetermined signal that is known to both a second communications node and the first communications node, a subcarrier of an OFDM symbol of the second field is used to carry useful information, and the useful information is physical layer control information and/or data; and a transmitter 1802, configured to send the signal packet that includes the preamble to the second communications node.

The first communications node 18 provided in this embodiment of the present invention may be used to execute the technical solution of the method embodiment shown in FIG. 14. Implementation principles thereof are similar, and details are not described herein again. Compared with the prior art, the technical solution provided in this embodiment of the present invention greatly reduces a signaling overhead and improves resource utilization.

Figure 19:
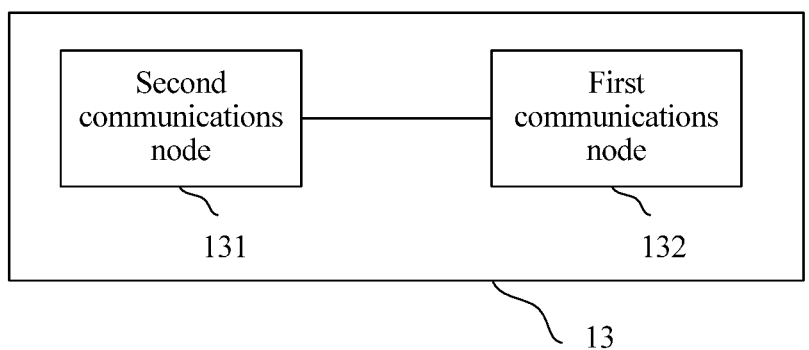
FIG. 19 is a schematic structural diagram of a communications system according to an embodiment of the present invention.

FIG. 19 is a schematic structural diagram of a communications system according to an embodiment of the present invention. As shown in FIG. 19, the communications system 13 provided in this embodiment of the present invention includes a second communications node 131 and a first communications node 132. The second communications node 131 may be the second communications node 11 according to any embodiment of the present invention, and the first communications node 132 may be the first communications node 12 according to any embodiment of the present invention.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A channel estimation method, comprising:
   obtaining a preamble in a signal packet sent by a first communications node, wherein the preamble comprises at least a first field and a second field, wherein a subcarrier of an orthogonal frequency division multiplexing (OFDM) symbol of the first field is used to carry a first reference signal, wherein the first reference signal is a predetermined signal that is known to both a second communications node and the first communications node, and wherein a subcarrier of an OFDM symbol of the second field is used to carry information, wherein the information comprises at least one of physical layer control information and data transmitted by using the signal packet; and obtaining, based on the first field and the second field in the preamble, a first channel estimate of each spatial flow on each subcarrier of a multiple-input multiple-output (MIMO) transmission frequency band, wherein the obtaining the first channel estimate of each spatial flow on each subcarrier of the MIMO transmission frequency band comprises:

obtaining, based on the first reference signal carried by the first field, a channel estimate of each spatial flow on a corresponding subcarrier in the first field;

obtaining, by interpolation, a second channel estimate of each spatial flow on each subcarrier of the MIMO transmission frequency band;

demodulating and decoding, based on the second channel estimate, the second field to obtain the information carried by the second field;

re-encoding and re-modulating, based on a modulation and coding scheme that is the same as that used in the demodulation and decoding the second field, the information carried by the second field, to generate a second reference signal corresponding to each subcarrier of each OFDM symbol of the second field;

obtaining, based on the second reference signal corresponding to each subcarrier of each OFDM symbol of the second field, a channel estimate of each spatial flow on a corresponding subcarrier in the second field; and obtaining, by combining channel estimates of each spatial flow on corresponding subcarriers in the first field and the second field, the first channel estimate of each spatial flow on each subcarrier of the MIMO transmission frequency band.

2. The method according to claim 1, wherein subcarriers in each OFDM symbol of the first field and the second field sequentially correspond to different spatial flows, and spatial flows corresponding to same subcarriers in different OFDM symbols are different.

3. The method according to claim 1, wherein subcarriers in each OFDM symbol of the first field and the second field sequentially correspond to different spatial flow groups, wherein spatial flow groups corresponding to subcarriers of a same location in different OFDM symbols are different, and wherein the spatial flow group comprises K spatial flows;

wherein in the first field, after undergoing orthogonal transform, the K spatial flows of each spatial flow group are sequentially transmitted by using subcarriers that are corresponding to the spatial flow group and that are of K OFDM symbols of the first field; and wherein in the second field, after undergoing orthogonal transform, the K spatial flows of each spatial flow group are sequentially transmitted by using subcarriers that are corresponding to the spatial flow group and that are of K OFDM symbols of the second field.

4. The method according to claim 1, wherein the subcarriers of the MIMO transmission frequency band for which the first channel estimate is obtained are any subcarriers of the MIMO transmission frequency band other than zero-frequency subcarriers or protection subcarriers that are used to suppress adjacent channel leakage of the MIMO transmission frequency band.

5. A channel estimation method, comprising:

identifying, by a first communications node, a preamble in a signal packet, wherein the preamble comprises at least a first field and a second field wherein a subcarrier of an orthogonal frequency division multiplexing (OFDM) symbol of the first field is used to carry a first reference signal wherein the first reference signal is a predetermined signal that is known to both the first communications node and a second communications node, and wherein a subcarrier of an OFDM symbol of the second field is used to carry information, wherein the information comprises at least one of physical layer control information and data transmitted by using the signal packet; and sending, by the first communications node, the signal packet that comprises the preamble to the second communications node, wherein a first channel estimate of each spatial flow on each subcarrier of a multiple-input multiple-output (MIMO) transmission frequency band is obtainable based on the first field and the second field in the preamble by:

obtaining based on the first reference signal carried by the first field a channel estimate of each spatial flow on a corresponding subcarrier in the first field;

obtaining, by interpolation, a second channel estimate of each spatial flow on each subcarrier of the MIMO transmission frequency band;

demodulating and decoding, based on the second channel estimate, the second field to obtain the information carried by the second field;

re-encoding and re-modulating, based on a modulation and coding scheme that is the same as that used in the demodulation and decoding the second field, the information carried by the second field, to generate a second reference signal corresponding to each subcarrier of each OFDM symbol of the second field;

obtaining, based on the second reference signal corresponding to each subcarrier of each OFDM symbol of the second field, a channel estimate of each spatial flow on a corresponding subcarrier in the second field; and obtaining, by combining channel estimates of each spatial flow on corresponding subcarriers in the first field and the second field, the first channel estimate of each spatial flow on each subcarrier of the MIMO transmission frequency band.

6. The method according to claim 5, wherein subcarriers in each OFDM symbol of the first field and the second field sequentially correspond to different spatial flows, and spatial flows corresponding to same subcarriers in different OFDM symbols are different.

7. The method according to claim 5, wherein subcarriers in each OFDM symbol of the first field and the second field sequentially correspond to different spatial flow groups wherein spatial flow groups corresponding to subcarriers of a same location in different OFDM symbols are different, and the spatial flow group comprises K spatial flows;

wherein in the first field, after undergoing orthogonal transform, the K spatial flows of each spatial flow group are sequentially transmitted by using subcarriers that are corresponding to the spatial flow group and that are of K OFDM symbols of the first field; and wherein in the second field, after undergoing orthogonal transform, the K spatial flows of each spatial flow group are sequentially transmitted by using subcarriers that are corresponding to the spatial flow group and that are of K OFDM symbols of the second field.

8. A second communications node, comprising:
a transceiver, configured to obtain a preamble in a signal packet sent by a first communications node, wherein the preamble comprises at least a first field and a second field wherein a subcarrier of an orthogonal frequency division multiplexing (OFDM) symbol of the first field is used to carry a first reference signal wherein the first reference signal is a predetermined signal that is known to both the second communications node and the first communications node and wherein a subcarrier of an OFDM symbol of the second field is used to carry information, wherein the information comprises at least one of physical layer control information and data transmitted by using the signal packet; and
a processor, configured to:
obtain, based on the first field and the second field in the preamble, a first channel estimate of each spatial flow on each subcarrier of a multiple-input multiple-output (MIMO) transmission frequency band, wherein the obtaining the first channel estimate of each spatial flow on each subcarrier of the MIMO transmission frequency band comprises:
obtaining based on the first reference signal carried by the first field a channel estimate of each spatial flow on a corresponding subcarrier in the first field;
obtaining by interpolation a second channel estimate of each spatial flow on each subcarrier of the MIMO transmission frequency band;
demodulating and decoding, based on the second channel estimate, the second field to obtain the information carried by the second field;
re-encoding and re-modulating, based on a modulation and coding scheme that is the same as that used in the demodulation and decoding the second field, the information carried by the second field, to generate a second reference signal corresponding to each subcarrier of each OFDM symbol of the second field;
obtaining, based on the second reference signal corresponding to each subcarrier of each OFDM symbol of the second field, a channel estimate of each spatial flow on a corresponding subcarrier in the second field; and
obtaining, by combining channel estimates of each spatial flow on corresponding subcarriers in the first field and the second field, the first channel estimate of each spatial flow on each subcarrier of the MIMO transmission frequency band.

9. The second communications node according to claim 8, wherein subcarriers in each OFDM symbol of the first field and the second field sequentially correspond to different spatial flows, and spatial flows corresponding to subcarriers of a same location in different OFDM symbols are different.

10. The second communications node according to claim 8,
wherein subcarriers in each OFDM symbol of the first field and the second field sequentially correspond to different spatial flow groups wherein spatial flow groups corresponding to subcarriers of a same location in different OFDM symbols are different, and wherein the spatial flow group comprises K spatial flows;
wherein in the first field, after undergoing orthogonal transform, the K spatial flows of each spatial flow group are sequentially transmitted by using subcarriers that are corresponding to the spatial flow group and that are of K OFDM symbols of the first field; and
wherein in the second field, after undergoing orthogonal transform, the K spatial flows of each spatial flow group are sequentially transmitted by using subcarriers that are corresponding to the spatial flow group and that are of K OFDM symbols of the second field.

11. The second communications node according to claim 8, wherein the subcarriers of the MIMO transmission frequency band for which the first channel estimate is obtained are any subcarriers of the MIMO transmission frequency band other than zero-frequency subcarriers and protection subcarriers that are used to suppress adjacent channel leakage of the MIMO transmission frequency band.

12. A first communications node, comprising:
a processor, configured to determine a preamble in a signal packet, wherein the preamble comprises at least a first field and a second field, wherein a subcarrier of an orthogonal frequency division multiplexing (OFDM) symbol of the first field is used to carry a first reference signal wherein the first reference signal is a predetermined signal that is known to both a second communications node and the first communications node, and wherein a subcarrier of an OFDM symbol of the second field is used to carry information, wherein the information comprises at least one of physical layer control information and data transmitted by using the signal packet; and
a transmitter, configured to send the signal packet that comprises the preamble to the second communications node, wherein a first channel estimate of each spatial flow on each subcarrier of a multiple-input multiple-output (MIMO) transmission frequency band is obtainable based on the first field and the second field in the preamble by:
obtaining, based on the first reference signal carried by the first field, a channel estimate of each spatial flow on a corresponding subcarrier in the first field;
obtaining, by interpolation, a second channel estimate of each spatial flow on each subcarrier of the MIMO transmission frequency band;
demodulating and decoding, based on the second channel estimate, the second field to obtain the information carried by the second field;
re-encoding and re-modulating, based on a modulation and coding scheme that is the same as that used in the demodulation and decoding the second field, the information carried by the second field, to generate a second reference signal corresponding to each subcarrier of each OFDM symbol of the second field;
obtaining, based on the second reference signal corresponding to each subcarrier of each OFDM symbol of the second field, a channel estimate of each spatial flow on a corresponding subcarrier in the second field; and
obtaining, by combining channel estimates of each spatial flow on corresponding subcarriers in the first field and the second field, the first channel estimate of each spatial flow on each subcarrier of the MIMO transmission frequency band.

13. The first communications node according to claim 12, wherein subcarriers in each OFDM symbol of the first field and the second field sequentially correspond to different spatial flows, and spatial flows corresponding to same subcarriers in different OFDM symbols are different.

14. The first communications node according to claim 12, wherein subcarriers in each OFDM symbol of the first field and the second field sequentially correspond to different spatial flow groups wherein spatial flow groups corresponding to subcarriers of a same location in different OFDM symbols are different, and the spatial flow group comprises K spatial flows;

wherein in the first field, after undergoing orthogonal transform, the K spatial flows of each spatial flow group are sequentially transmitted by using subcarriers that are corresponding to the spatial flow group and that are of K OFDM symbols of the first field; and wherein in the second field, after undergoing orthogonal transform, the K spatial flows of each spatial flow group are sequentially transmitted by using subcarriers that are corresponding to the spatial flow group and that are of K OFDM symbols of the second field.

* * * * *